United States Patent Office
3,125,570
Patented Mar. 17, 1964

3,125,570
3,16-DIAMINO-3,5-PREGNADIENES AND PROCESS FOR PREPARING SAME
László Vargha, Márta Rados, Endre Kasztreiner, and László Szporny, all of Budapest, Hungary, assignors to Richter Gedeon Vegyészeti Gyár RT., Budapest, Hungary
No Drawing. Filed Aug. 21, 1962, Ser. No. 218,464
6 Claims. (Cl. 260—239.5)

This invention relates to new and useful basic derivatives of steroid compounds. More particularly it is concerned with novel derivatives of certain 3-enamino-$\Delta^{3,5}$-steroids substituted by a hydroxyl group in the 17α- and by a basic substituent in the 16-position.

It is known that various steroid compounds, e.g. $\Delta^{1}$-dehydro-17α-methyltestosterone and nor-androstenolone phenylpropionate show therapeutically useful anabolic effects; it is however, an important disadvantage of these known anabolic steroids that they exert simultaneously also undesirable hormonal (e.g. androgenic or estrogenic) side effects which impose important restrictions on their applicability.

It has surprisingly been found that the new 3-enamino-$\Delta^{3,5}$-steroids of the general Formula I

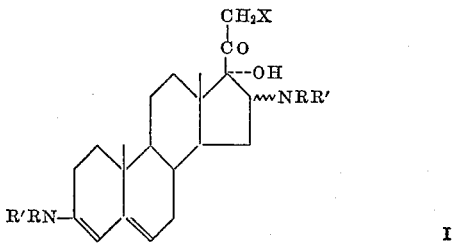

where X stands for a member selected from the group consisting of hydrogen, hydroxyl and acyloxy radicals, NRR' stands for a member selected from the group consisting of dialkylamino, di-(substituted alkyl)-amino, other disubstituted amino (e.g. di-cycloalkyl-amino, diarylamino) and heterocyclic amino radicals, have a therapeutically valuable anabolic effect, without having a simultaneously the undesired hormonal (e.g. androgenic or estrogenic) side effects of the anabolic steroids known hitherto.

These new compounds can be prepared according to the present invention by reacting the 16,17-oxido-$\Delta^{4}$-pregnene-3,20-dione, or its 21-hydroxyl or 21-acyloxy derivatives of the general Formula II

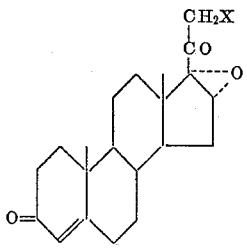

with a secondary amine of the general Formula III

HNRR'    III (X and NRR' have in these formulae the same meaning as above). Two basic groups are being introduced thereby into the molecule, one of these into the 3-position, while an enamine structure is formed; the other basic group is introduced into the 16-position, under simultaneous splitting of the 16,17-epoxide ring, whereby an α-hydroxyl group is formed in the 17-position.

The process according to the invention can be carried out by reacting the 16,17-oxido $\Delta^{4}$-pregnene-3,20-dione, or its 21-hydroxy or 21-acyloxy derivatives in the presence or absence of a diluent, preferably at an elevated temperature, with the secondary base corresponding to the desired end product.

Diluents are chosen among organic solvents which prove to be inert against the reaction components, such as lower alkanoles, dioxane etc. It is advantageous to use an excess of the secondary base according to Formula III. In case of reaction components or diluents having a low boiling point the reaction can be carried out in a closed vessel. Owing to the fact that the 16,17-oxido-ring proves to be rather resistant to bases, the reaction is preferably carried out in presence of substances having an accelerating effect upon the reaction. According to our experience water or phenol may be used advantageously as such substance, for in their presence the splitting of the epoxide ring and the simultaneous addition of the base occurs already at lower temperatures and within shorter time.

If the steroid compound used as starting material contains an acyloxy group in the 21-position, this group may be split off entirely or partly in the course of the reaction; thus hydroxyl group is formed in the 21-position of the end product.

As secondary bases of the general formula III there can be used dialkyl amines, such as dimethylamine, or dialkylamines substituted in the alkyl groups, such as diethanol amine, and heterocyclic secondary amines, such as morpholine, methyl morpholine, piperidine, piperazine, pyrrolidine etc.

The following examples serve to illustrate the process according to the invention.

*Example 1.—3,16-Di-(N-Morpholino)3,5-Pregnandiene-17α-Ol-20-One*

The mixture of 3.3 g. 16α,17α-oxidio-progesterone, 0.9 g. phenol and 10 ml. morpholine is stirred for 16 hours at a temperature of 130–135° C. After cooling the excess of morpholine is distilled off and the residue is triturated with methanol, sucked off, washed with methanol and recrystallized from ethyl acetate. The product melts at 263–266° C.; $[\alpha]_D = -121.7°$ (c.=1, chloroform).

*Example 2.—3,16-Di-(N-Piperidino)-3,5-Pregnandiene-17α-Ol-20-One*

The mixture of 3.3 g. 16α,17α-oxido-progesterone, 0.9 g. phenol and 10 ml. piperidine are heated in a sealed tube for 16 hours at a temperature of 135° C. The reaction product crystallizes while cooling. The excess of piperidine is distilled off, the residue is triturated with 30 ml. methanol, sucked off and recrystallized from ethyl acetate. The product melts at 212–216° C.; $[\alpha]_D = -109°$ (c.=1, chloroform).

*Example 3.—3,16-Di-(N-Pyrrolidino)-3,5-Pregnandiene-17α-Ol-20-One*

The mixture of 3.3 g. 16α,17α-oxido-progesterone, 0.9 g. phenol and 10 ml. pyrrolidine is heated in a sealed tube for 20 hours at a temperature of 140° C. The product crystallizes while cooling. It is triturated with methanol, sucked off, washed with methanol and recrystallized from benzene. The product melts at 267–272° C.; $[\alpha]_D = -121°$ (c.=1, chloroform).

*Example 4.—3,16-Di-(N-Dimethylamino)-3,5-Pregnandiene-17α-Ol-20-One*

The mixture of 6.6 g. 16α,17α-oxido-progesterone, 1.8 g. phenol and 40 ml. dimethyl amine is kept for 20 hours in an autoclave at a temperature of 145–150° C. After cooling the product is triturated with methanol, sucked off, washed with methanol and recrystallized from benzene. The product melts at 240–246° C.; $[\alpha]_D = -143.5°$ (c.=1, chloroform).

What we claim is:
1. A steroid derivative of the formula

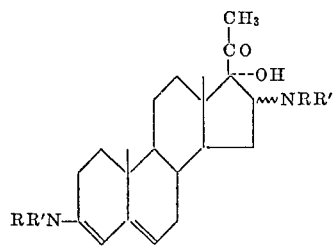

wherein RR'N represents a member selected from the group consisting of di-(lower alkyl)-amino, morpholino, piperidino and pyrrolidino.

2. 3,16-di-(N-morpholino)-3,5-pregnandiene-17α-ol-20-one.

3. 3,16-di-(N-piperidino)-3,5-pregnandiene-17α-ol-20-one.

4. 3,16-di-(N-pyrrolidino)-3,5-pregnandiene-17α-ol-20-one.

5. 3,16-di-(N-dimethylamino)-3,5-pregnandiene-17α-ol-20-one.

6. A process for the production of steroid derivatives substituted by a hydroxyl group in the 17α-position and by basic groups in the 3- and 16-positions, which comprises reacting 16α,17α-oxido-progesterone with a secondary amine selected from the group consisting of di-(lower alkyl)-amines, morpholine, piperidine and pyrrolidine.

References Cited in the file of this patent
UNITED STATES PATENTS
2,808,399    Dodson _____ Oct. 1, 1957